(No Model.)
A. LANG & T. W. TALBOT.
SASH BALANCE.
No. 352,415. Patented Nov. 9, 1886.
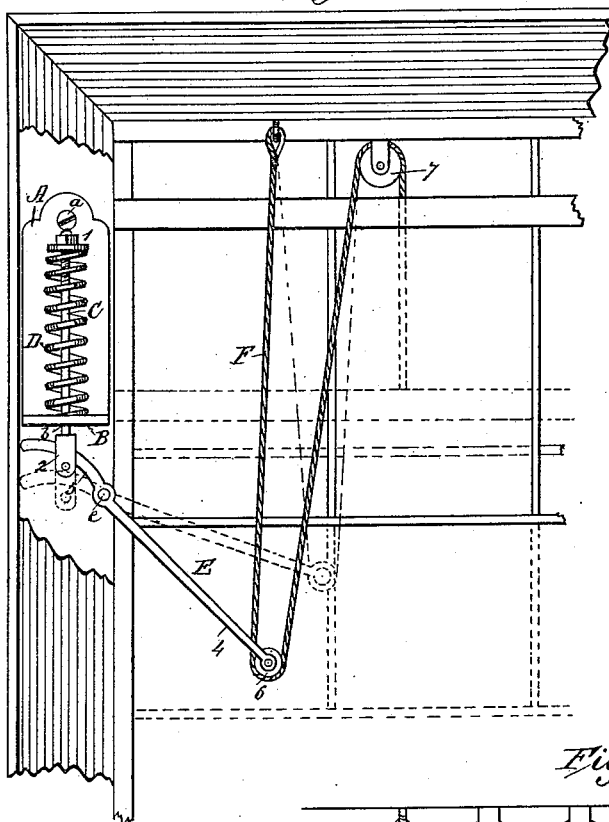
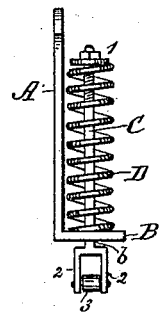
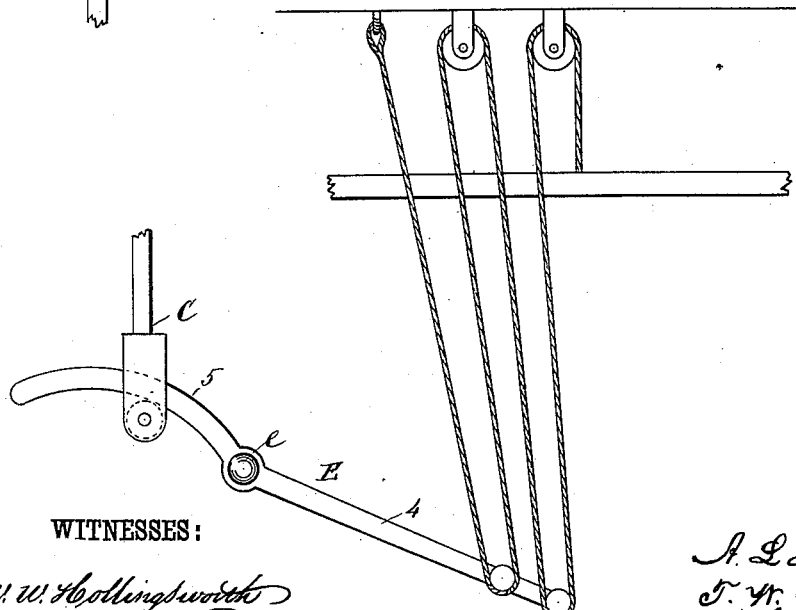
WITNESSES:
W. W. Hollingsworth
P. B. Turpin
INVENTOR:
A. Lang
T. W. Talbot
BY Munn & Co.
ATTORNEYS.

UNITED STATES PATENT OFFICE.

ALOIS LANG AND THOMAS W. TALBOT, OF FLORENCE, SOUTH CAROLINA; SAID TALBOT ASSIGNOR TO SAID LANG.

SASH-BALANCE.

SPECIFICATION forming part of Letters Patent No. 352,415, dated November 9, 1886.

Application filed April 1, 1886. Serial No. 197,484. (No model.)

*To all whom it may concern:*

Be it known that we, ALOIS LANG and THOMAS W. TALBOT, of Florence, in the county of Darlington and State of South Carolina, have invented a new and useful Improvement in Sash-Balances, of which the following is a specification.

Our invention is an improvement in counterbalances for weights, and is especially intended for use in connection with a window-sash.

While, as stated, the invention is especially intended for use in connection with windowsashes, and for convenience of illustration is shown in such connection, and while the appended claims contain clauses referring specifically to window-sashes, we do not limit the invention to such use, as it will be understood that it may be used to balance gasometers, signs, vertically-movable lamps, and other objects which may be moved vertically and which it may be desired to secure at different points of adjustment.

The invention consists, broadly, in a pivoted lever having one arm or end adapted for connection with the object it is desired to counterbalance, and having a spring connected to its opposite end or arm in such manner that it will adjust along the same in order that where the spring is compressed so it will exert the greatest force on the lever it will be adjusted near the fulcrum thereof, so its increase in force may be compensated for by the decrease in lever power.

The invention further consists in certain novel constructions and combinations of parts, as will be hereinafter described, and pointed out in the claims.

In the drawings, Figure 1 is a face view of our improvement applied to a window, in which connection we will describe the same. Fig. 2 is a detail side view of the bracket, spring, and bolt. Fig. 3 shows a different disposition of the connecting-cord from that shown in Fig. 1.

In carrying out our invention we provide a bracket, A, pivoted at *a* to the window-frame or other suitable support, and having a footpiece or flange, B, which latter is provided with a perforation, *b*. Through this perforation *b* projects a bolt, C, having its upper end threaded to receive a nut, 1, which constitutes the stop for the spring D, and having its lower end bifurcated, forming arms 2, between the lower ends of which we journal the anti-friction roll 3. A spring, D, is placed on the bolt C, and bears between the stop 1 and the flange B.

The lever E is pivoted at *e*, between its ends, forming arms 4 and 5, the former of which, for convenience of reference, we term the "outer" and the latter the "inner" end or arm of the lever. The inner arm, 5, is passed between the arms 2 above the roller 3, and is preferably curved, as shown, to facilitate the adjustment of the spring-connection along the lever. The outer arm, 4, of the lever is connected with the sash or other object to be raised, usually by means of cord F, secured at one end to the window-frame or other support, passed thence around a pulley, 6, on the arm 4, a pulley, 7, on the window-frame and secured at its opposite end to the window-sash.

Instead of the arrangement of the cords shown in Fig. 1 it will be understood that that shown in Fig. 3 might be used. It will also be understood that instead of the bracket and bolt and arrangement of spring as described, and which are preferred, the spring might be connected at one end to a support and have at its opposite end a ring or other device engaging the lever, so it could adjust along the arm of the lever. In this last case the spring would be practically connected directly with the lever instead of through the intervention of a separate connection.

In dotted lines, Fig. 1, we show the sash drawn down. It will be seen that when at the full-line position of the parts the spring is expanded and acts with the least tension on the lever, and that in such position it has the advantage of the greatest leverage, while in the dotted position the spring is compressed and acts with the greatest force on the lever, but has been adjusted to such point that it has but a slight leverage, thus loss or gain in spring power or tension is compensated by a proportionate gain or loss in leverage by the movement of the spring-connection along the arm of the lever.

Having thus described our invention, what we claim as new is—

1. An improved sash-balance, comprising a lever pivoted between its arms or ends and having one end adapted for connection with the object to be balanced, and a spring connected with the other end or arm of said lever and movable along the same, whereby the spring will have the greatest leverage when at its least tension and the least leverage when at its greatest tension, substantially as set forth.

2. The improved sash-balance herein described, consisting of the bracket provided with a perforated foot-piece, the bolt passed through said foot-piece and having a stop on its upper end, and its lower end bifurcated and provided with an anti-friction roller, and a lever pivoted between its ends and having one end curved and inserted through the bifurcated end of the bolt and a spring placed on the bolt and bearing between the foot-piece of the bracket and the stop of the bolt, substantially as set forth.

3. The combination, with a window-sash and frame, of a pivoted lever having one arm provided with a pulley, a spring connected with and movable along the opposite arm of the lever, and a cord connected at one end with the window-frame, disposed thence around guide-pulleys on the lever and the window-frame and secured at its opposite end to the sash, substantially as set forth.

ALOIS LANG.
THOMAS W. TALBOT.

Witnesses:
R. A. McCORKLE,
CHAS. BUTTMANN.